(12) United States Patent
Iwanaga

(10) Patent No.: US 7,520,359 B2
(45) Date of Patent: Apr. 21, 2009

(54) MOTORCYCLE

(75) Inventor: Sadamu Iwanaga, Shizuoka (JP)

(73) Assignee: Yamaha Hatsudoki Kabushiki Kaisha, Shizuoka-Ken (JP)

(*) Notice: Subject to any disclaimer, the term of this patent is extended or adjusted under 35 U.S.C. 154(b) by 125 days.

(21) Appl. No.: 10/554,257

(22) PCT Filed: Jun. 30, 2004

(86) PCT No.: PCT/JP2004/009571

§ 371 (c)(1),
(2), (4) Date: Aug. 10, 2006

(87) PCT Pub. No.: WO2005/002954

PCT Pub. Date: Jan. 13, 2005

(65) Prior Publication Data

US 2006/0266572 A1    Nov. 30, 2006

(30) Foreign Application Priority Data

Jul. 1, 2003   (JP) ............................ 2003-189753
Jun. 2, 2004   (JP) ............................ 2004-164303

(51) Int. Cl.
*B62K 11/00*   (2006.01)

(52) U.S. Cl. ..................................... 180/219; 293/105

(58) Field of Classification Search ................. 180/219, 180/225, 229, 119; 280/288.4, 288.3, 288.2, 280/304.4, 304.5; 293/105; 296/78.1; D12/186
See application file for complete search history.

(56) References Cited

U.S. PATENT DOCUMENTS

| 3,927,727 A * | 12/1975 | Hanagan ...................... 180/219 |
| 5,107,949 A * | 4/1992 | Gotoh et al. ................. 180/219 |
| 6,840,344 B2 * | 1/2005 | Galbraith et al. ............ 180/219 |

FOREIGN PATENT DOCUMENTS

| EP | 0 985 599 | 3/2000 |
| JP | 405286469 | * 11/1993 |
| JP | 10-236358 | 9/1998 |
| JP | 2003-212173 | 7/2003 |

* cited by examiner

*Primary Examiner*—Anne Marie M. Boehler
(74) *Attorney, Agent, or Firm*—Hogan & Hartson LLP

(57) ABSTRACT

A motorcycle 1, in which rear portions of glove bars 2 and a seat cowl 24 are formed integrally, and front and rear portions of the glove bars 2, respectively, are mounted to a body frame 8. Accordingly, with the motorcycle 1, while reduction in cost is achieved, any clearance is prevented from being formed at connecting portions of the glove bars and the seat cowl to mar an outward appearance, and a load applied to the seat cowl from the glove bars is decreased, thus leading to reduction of the seat cowl in weight.

8 Claims, 16 Drawing Sheets

MOTORCYCLE

TECHNICAL FIELD

The present invention relates to a motorcycle provided with a seat cowl and glove bars.

BACKGROUND ART

Conventionally, motorcycles of this type include, for example, one disclosed in Patent Document 1 (JP-A-5-286469 (pages 2-3, FIGS. 1, 10, 11, 13)). The motorcycle disclosed in the Patent Document 1 comprises a seat cowl that covers a lower portion of a seat rear part from both left and right sides and the rear. The seat cowl is mounted to a body frame and provided on a rear portion thereof with glove bars, which project laterally of a vehicle body.

When a fellow rider seated on a rear portion of a seat stabilizes the upper part of the body, or a driver lifts a rear portion of a vehicle body in order to stand a main stand, the glove bars are grasped and mounted to the body frame and the seat cowl by struts, which are provided at both ends of the vehicle body in a longitudinal direction to extend inside the vehicle body.

The glove bars mounted to the body frame has the struts extending through the seat cowl and inside the vehicle body, and ends of the struts inside the vehicle body are mounted to the body frame. The glove bars mounted to the seat cowl has the ends of the struts inside the vehicle body mounted to the seat cowl.

In addition, the applicant of the present application could not find a prior art document closely related to the invention until the filing of the present application except prior art documents specified by information of prior art documents described in the specification of the present application.

DISCLOSURE OF THE INVENTION

With the conventional motorcycle described above, the construction, in which the glove bars are mounted to the body frame, causes a problem that clearances between the struts of the glove bars and holes of the seat cowl for passage of the glove bars become in many cases nonuniform to mar an outward appearance. The reason for this is that since the glove bars are mounted to the body frame by bolts and the seat cowl is manufactured by molding, larger tolerance and manufacturing error than those in ordinary working are involved to frequently cause disagreement between positions of the struts and positions of holes for passage of the glove bars. In order to make clearances on the connecting portions uniform, it is necessary to perform manufacture and assembly of the glove bars and molding of the seat cowl with high accuracy, so that an increase in cost cannot be avoided.

On the other hand, that construction, in which glove bars are mounted to a seat cowl, involves a problem that the seat cowl is increased in weight since a large weight corresponding to a weight of the upper body of a rider is applied to the seat cowl from the glove bars, which makes it necessary to enhance the seat cowl in stiffness.

The invention has been thought of in order to dissolve the problems and has its object to prevent clearances from being formed on connecting portions between glove bars and a seat cowl to mar an outward appearance while attempting to reduce the cost, as well as to enable achieving lightening of the seat cowl by providing a construction such that a load applied to the seat cowl from the glove bars is decreased.

The object is attained as follows.

(1) The motorcycle according to the invention comprises a seat cowl provided rearwardly of a seat and a pair of left and right glove bars provided in the vicinity of a rear portion of the seat, rear portions of the glove bars and the seat cowl being formed integrally, and front and rear portions of the glove bars, respectively, being mounted to a body frame.

(2) The motorcycle according to the invention further comprises, in addition to the constitution of the motorcycle according to the invention described in (1), a front mount, by which the front portions of the glove bars are mounted to a vehicle body from laterally, and a rear mount, by which the rear portions of the glove bars are mounted to the vehicle body from above, the glove bars being arranged so that at least the front portions thereof are inclined forward and downward as viewed in side view, and the front mount being arranged on forward extensions of the front portions of the glove bars.

(3) The motorcycle according to the invention has, in addition to the constitution of the motorcycle according to the invention described in (2), a constitution, in which the rear mount is covered by the seat from above, wherein the rear mount is covered by the seat from above.

(4) The motorcycle according to the invention has, in addition to the constitution of the motorcycle according to the invention described in (1), a constitution, in which both side walls of the seat cowl in a left and right direction are formed curvedly to be made convex outside the vehicle body as viewed from the rear of the vehicle body.

(5) The motorcycle according to the invention further comprises, in addition to the constitution of the motorcycle according to the invention described in (4), a reinforcement rib provided on an inner surface of a side wall of the seat cowl to extend vertically.

(6) The motorcycle according to the invention further comprises, in addition to the constitution of the motorcycle according to the invention described in (5), a tail light mounted to the reinforcement rib.

(7) The motorcycle according to the invention has, in addition to the constitution of the motorcycle according to the invention described in (5), a constitution, in which the reinforcement rib is provided in the vicinity of the rear mount.

(8) The motorcycle according to the invention has, in addition to the constitution of the motorcycle according to the invention described in any one of (1) to (7), a constitution, in which the glove bars and the seat cowl are molded from a reinforced plastics with glass fibers.

According to the invention, since the seat cowl is formed integral with the glove bars, there is caused not a problem in terms of outward appearance, in which clearances are formed on connecting portions between the both, even when the both are not formed with high accuracy as in the case where the glove bars and the seat cowl are formed separately. Also, it is possible to realize simplification of manufacturing processes owing to integral molding and a considerable decrease in cost.

Also, since the front and rear portions of the glove bars, respectively, are mounted to the body frame, a major part of a load applied to the glove bars can be effectively born by the body frame and a load applied to the seat cowl from the glove bars can be decreased although the seat cowl is formed integral with the glove bars. Therefore, the seat cowl can be formed to be relatively thin in thickness, thus enabling achieving reduction in cost and lightening.

According to the invention described in (2), the mount bolts that mount the front ends of the glove bars to the body frame are positioned on a line of action of a load and a transmission path of a load is formed to be straight, so that those portions of the front ends of the glove bars, which are mounted to the body frame, can be formed to be compact and to have a high strength. Also, a worker can clamp the mount bolts, by which the rear portions of the glove bars are mounted to the body frame, while looking down from above, so that it is possible to easily mount the glove bars to the body frame.

According to the invention described in (3), since the seat can prevent those portions of the rear portions of the glove bars, which are mounted to the body frame, from coming out in outward appearance of the vehicle body, parts can be reduced in number and reduction in cost can be achieved as compared with the case where a cover is used to cover and hide the mounted portions of the rear portions of the glove bars.

According to the invention described in (4), since the both side walls are enhanced in stiffness as compared with the case where the both side walls of the seat cowl are formed to assume a shape of a vertically extending flat plate, the seat cowl can be formed so as to be made further thin in thickness. Therefore, it is possible to further achieve reduction in cost and lightening.

According to the invention described in (5), since the reinforcement rib enhances the side wall of the seat cowl in stiffness, the seat cowl can be formed so as to be made further thin in thickness. Therefore, it is possible to further achieve reduction in cost and lightening.

According to the invention described in (6), since a tail light can be mounted to the seat cowl without the use of any bracket or brackets that exclusively mount the tail light, reduction in cost can be achieved in mounting the tail light to the seat cowl.

According to the invention described in (7), since a load applied to the reinforcement rib can be born by the body frame, the seat cowl can be enhanced further in stiffness.

According to the invention described in (8), since an integral molding composed of the glove bars and the seat cowl can be formed to be relatively lightweight although it is formed to be large in size as compared with conventional glove bars. Therefore, the glove bars and the seat cowl can be formed integrally while an increase of the vehicle body in weight is held down to the minimum.

Figure 1:
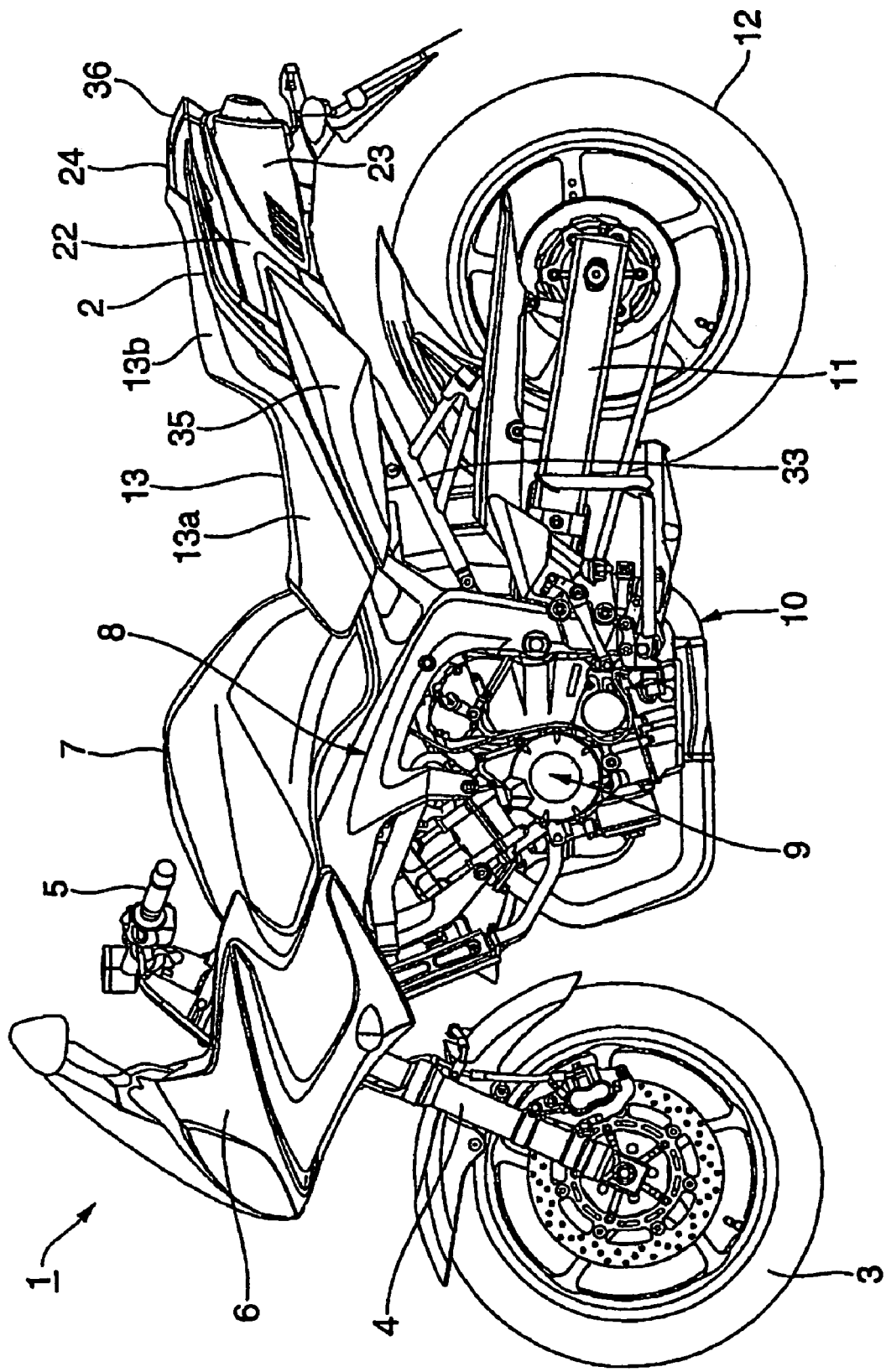
FIG. 1 is a side view showing a motorcycle according to the invention.

In addition, the reference numeral 2 in the figures denotes a glove bar, 8 a body frame, 13 a seat, 15 a seat rail, 16 a cross member, 24 a seat cowl, 25 a bar, 26 a grip, 27 a stay, 28 a front mount bracket, 29 a rear mount bracket, 30 a gusset plate, 31 a mount frame, 32, 34 a mount bolt, 36 a tail light, 41 a side wall, 42 an upper wall, and 43 a reinforcement rib.

BEST MODE FOR CARRYING OUT THE INVENTION

An embodiment of a motorcycle according to the invention will be described below in detail with reference to FIGS. 1 to 16.

Figure 2:
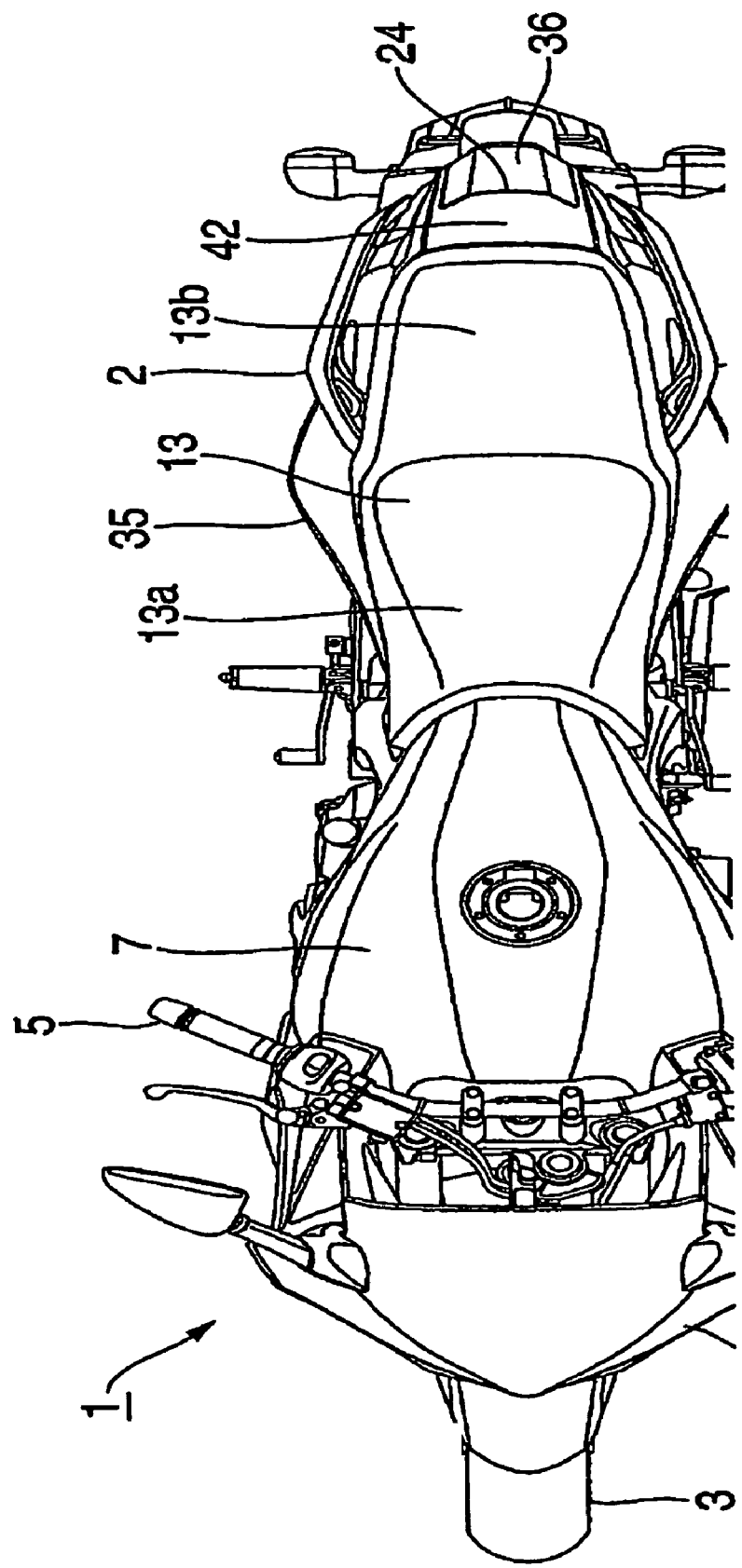
FIG. 2 is a plan view showing the motorcycle according to the invention.
Figure 3:
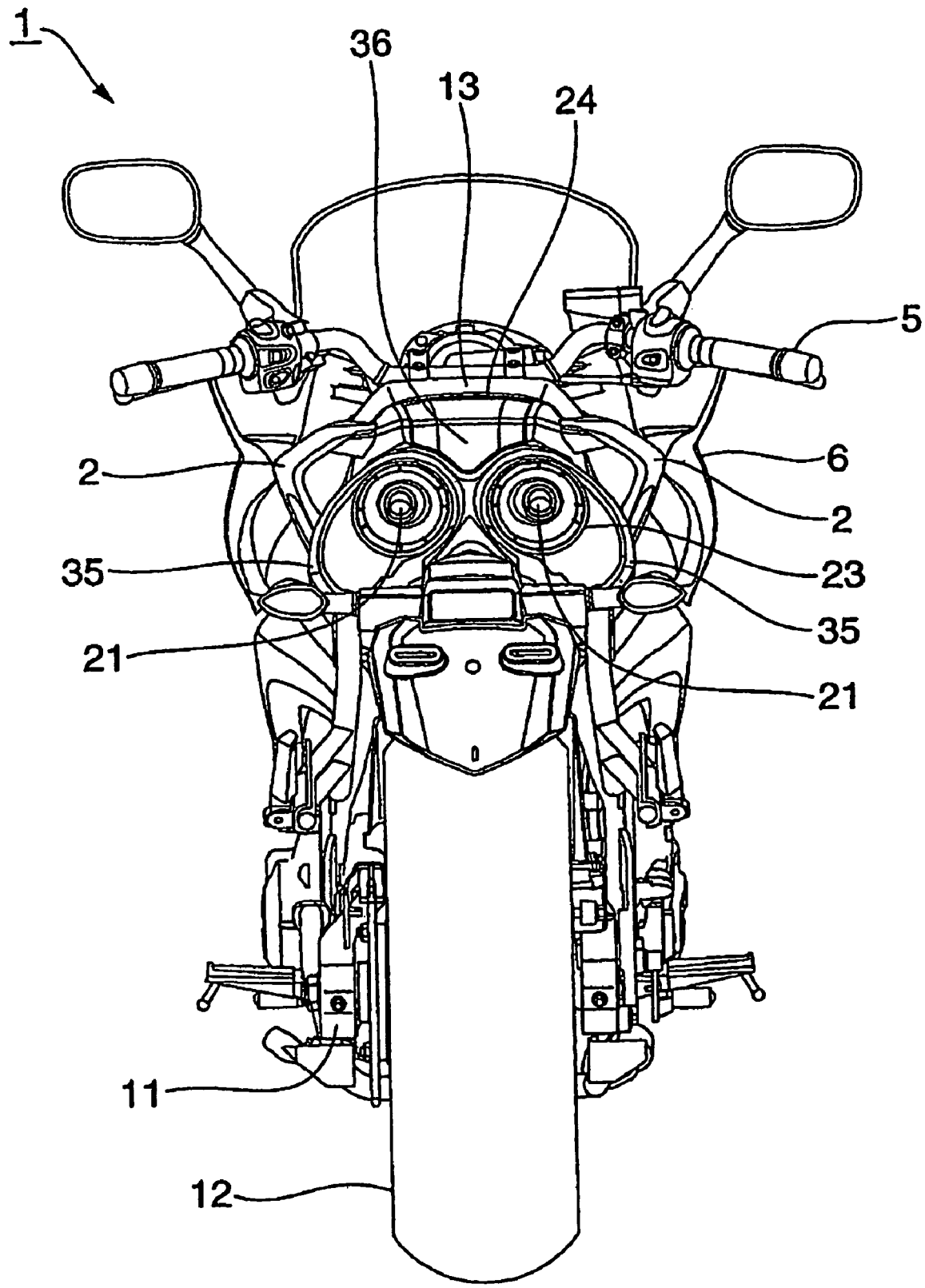
FIG. 3 is a back view showing the motorcycle according to the invention.
Figure 4:
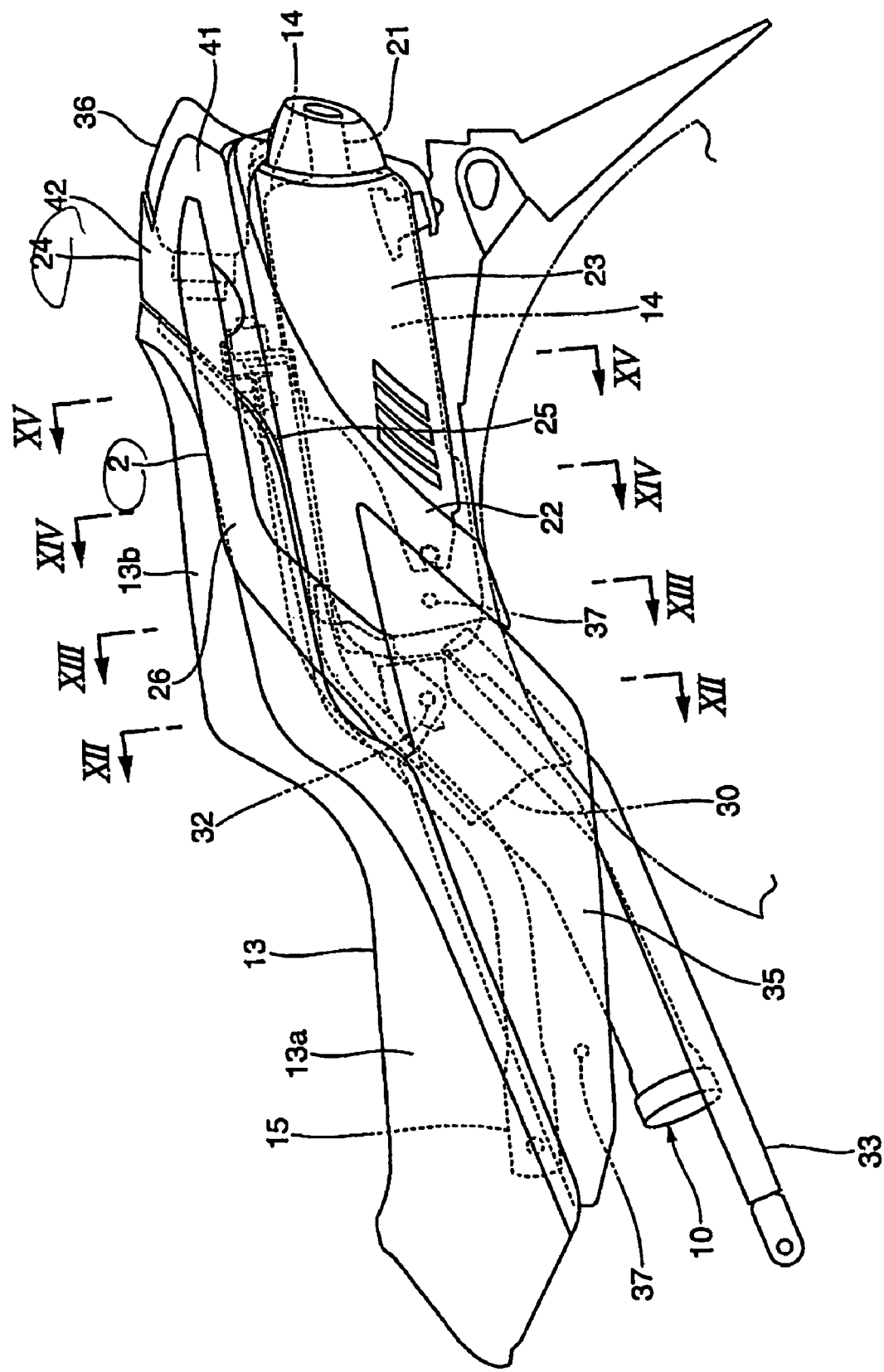
FIG. 4 is a side view showing, in enlarged scale, a seat part.
Figure 8:
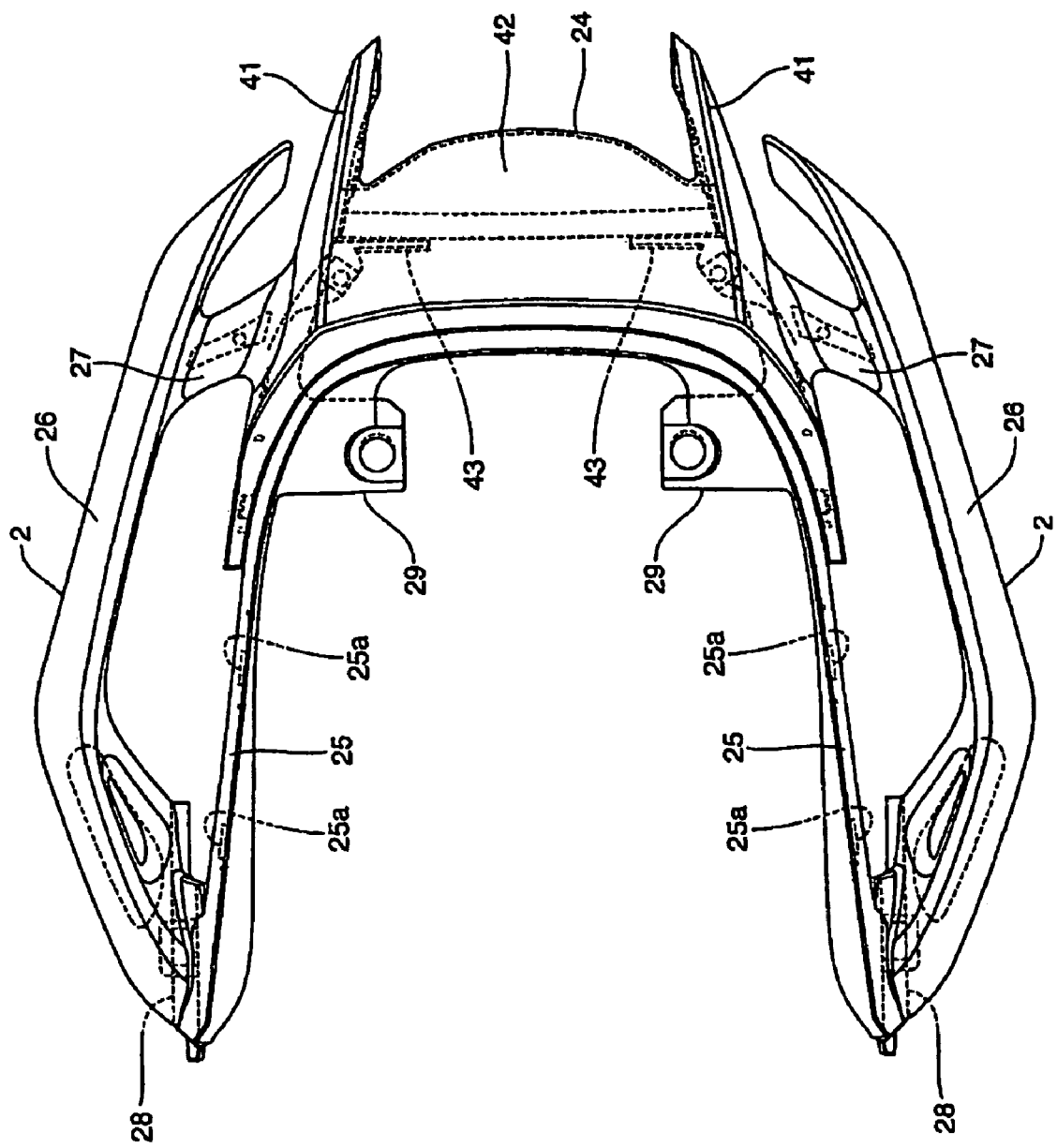
FIG. 8 is a plan view showing the glove bar and the seat cowl.
Figure 9:
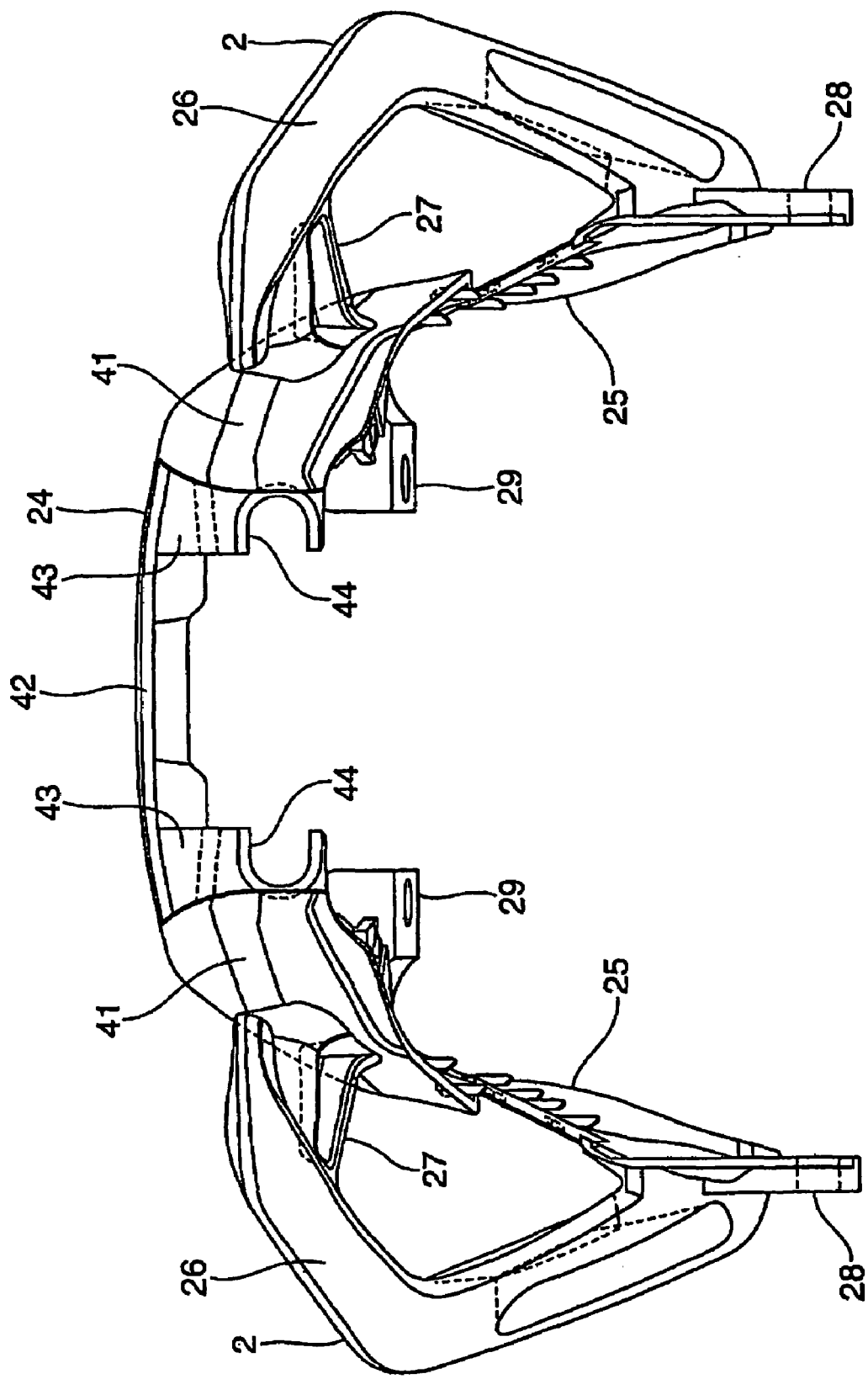
FIG. 9 is a back view showing the glove bar and the seat cowl.
Figure 10:
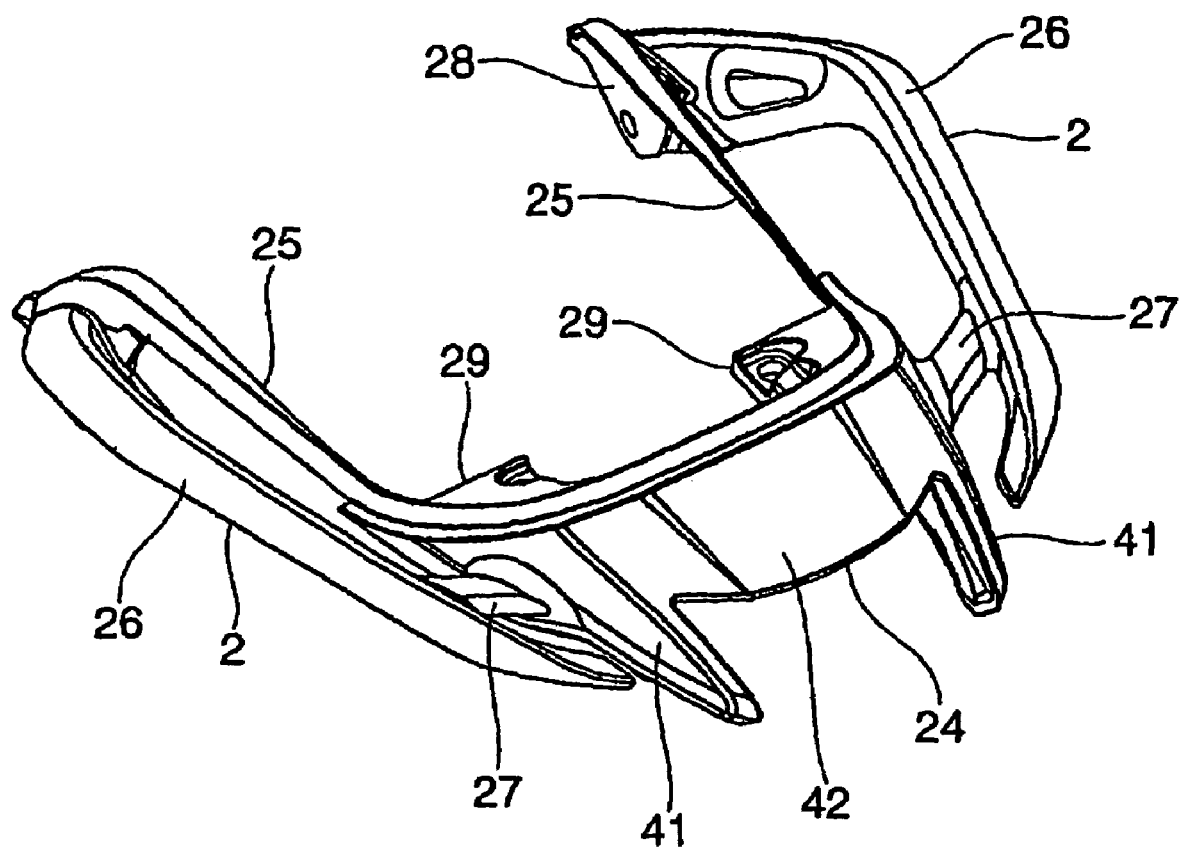
FIG. 10 is a perspective view showing the glove bar and the seat cowl.

FIG. 1 is a side view showing a motorcycle according to the invention, FIG. 2 is a plan view showing the motorcycle, and FIG. 3 is a back view showing the motorcycle. FIG. 4 is a side view showing, in enlarged scale, a seat part, FIG. 5 is a side view showing, in enlarged scale, a glove bar mount part, FIG. 6 is a plan view showing the glove bar mount part, FIG. 7 is a side view showing a glove bar and a seat cowl, FIG. 8 is a plan view showing the glove bar and the seat cowl, FIG. 9 is a back view showing the glove bar and the seat cowl, and FIG. 10 is a perspective view showing the glove bar and the seat cowl.

Figure 5:
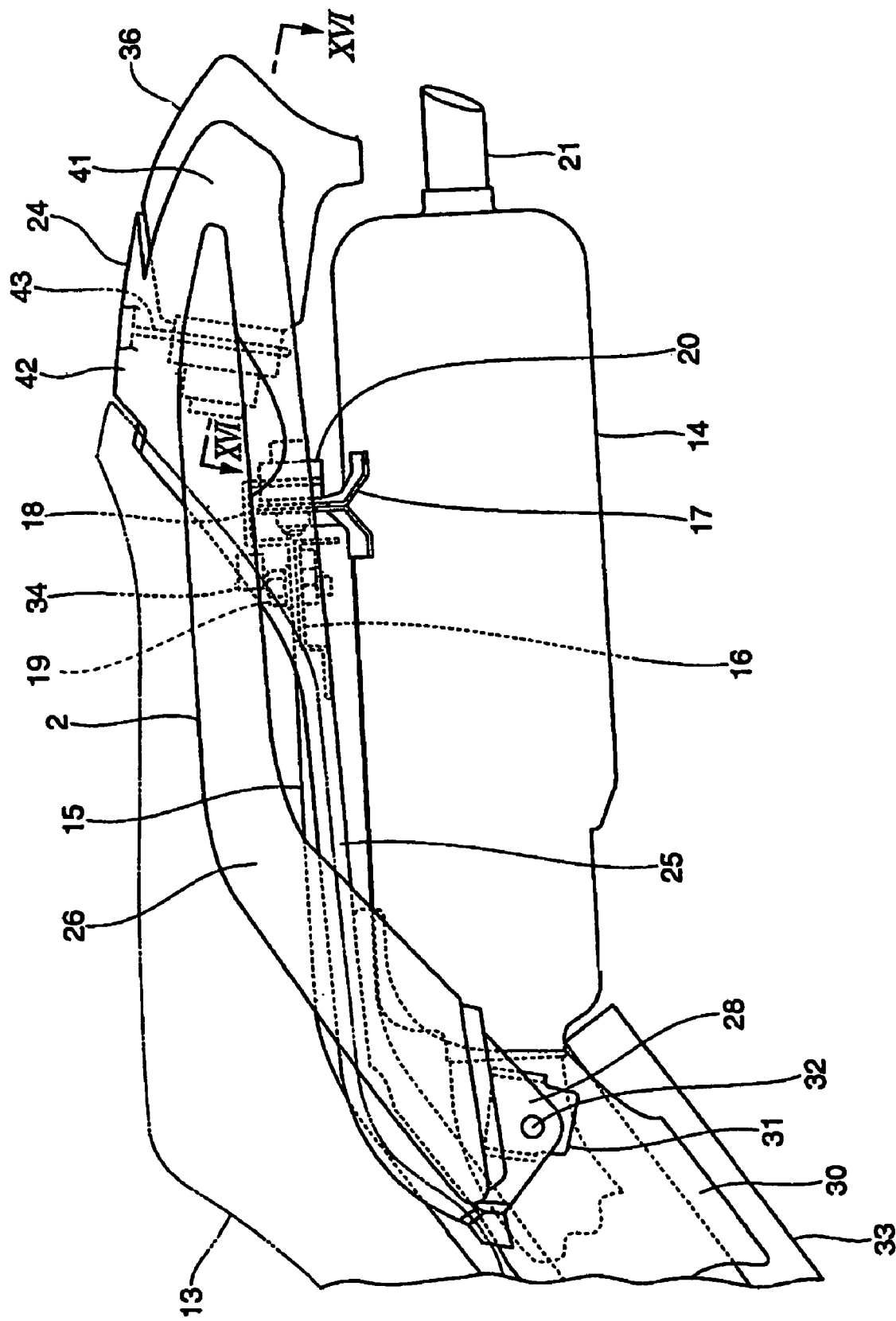
FIG. 5 is a side view showing, in enlarged scale, a glove bar mount part.
Figure 6:
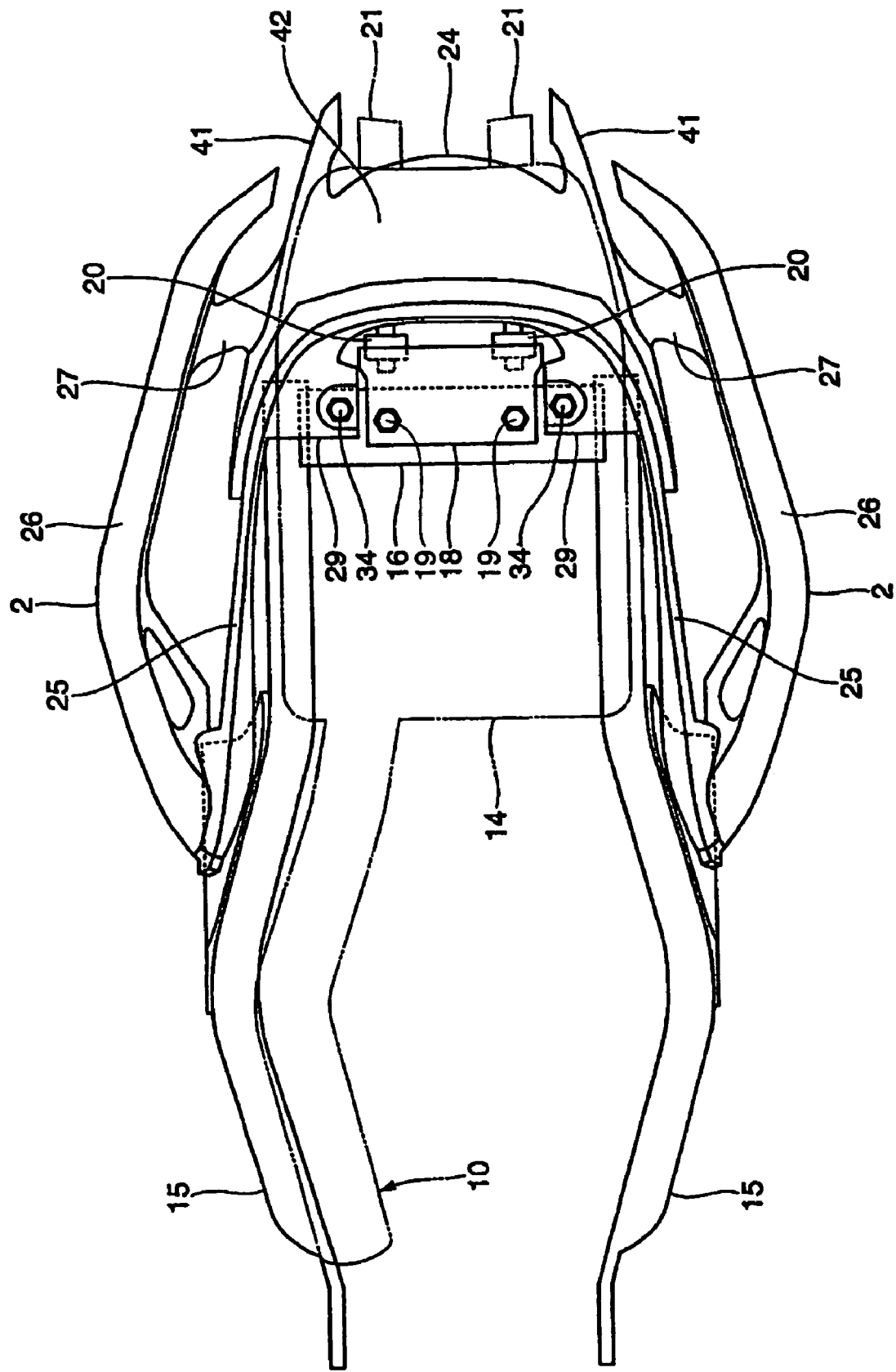
FIG. 6 is a plan view showing, in enlarged scale, the glove bar mount part.
Figure 7:
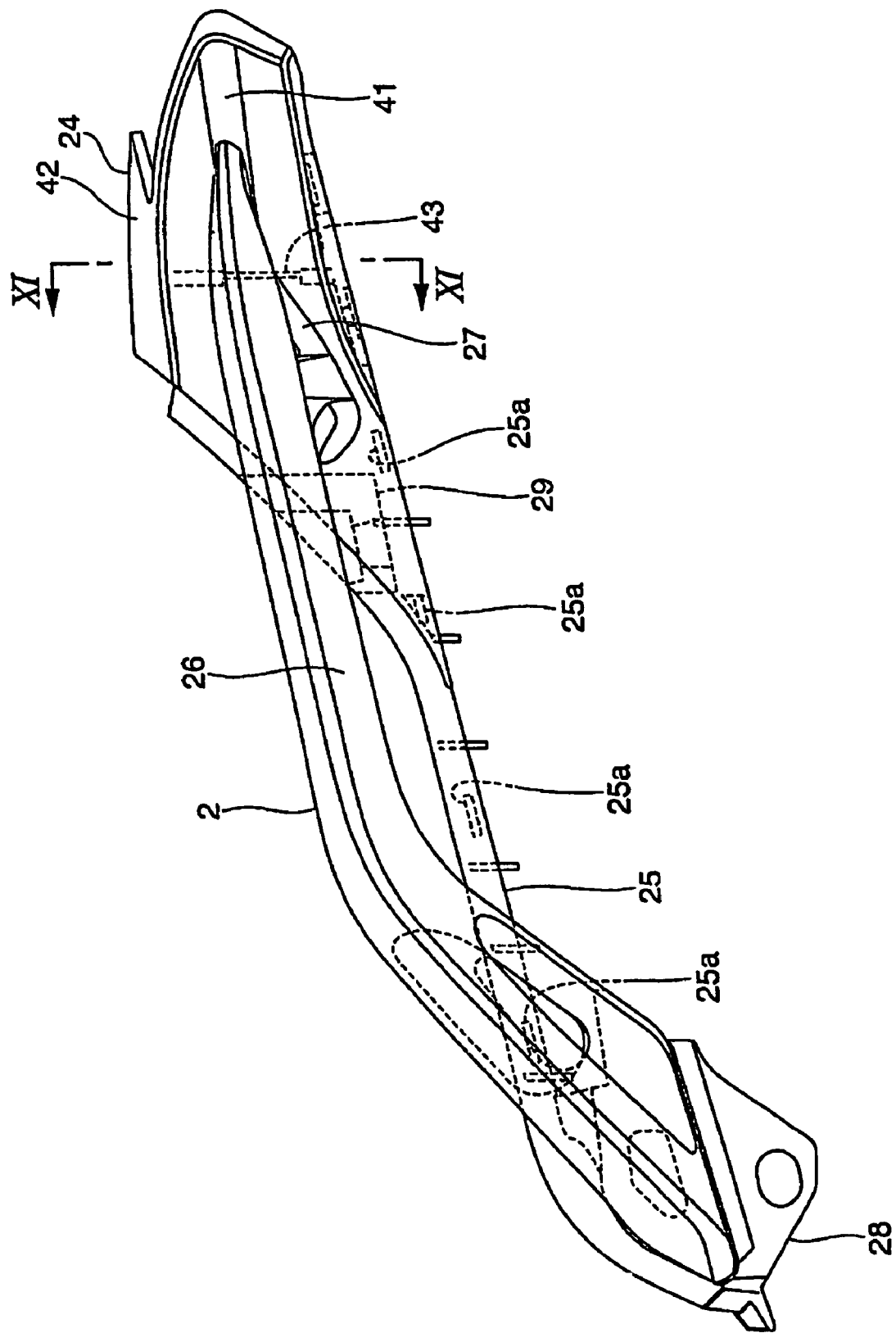
FIG. 7 is a side view showing a glove bar and a seat cowl.
Figure 11:
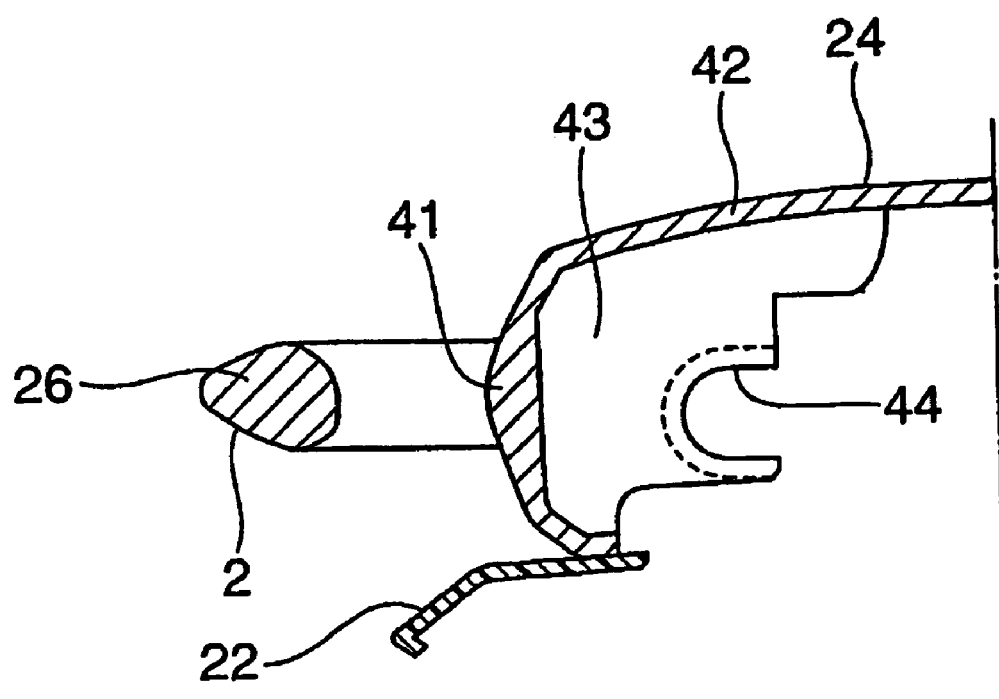
FIG. 11 is a cross sectional view taken along the line XI-XI in FIG. 6 and showing the glove bar and the seat cowl.
Figure 12:
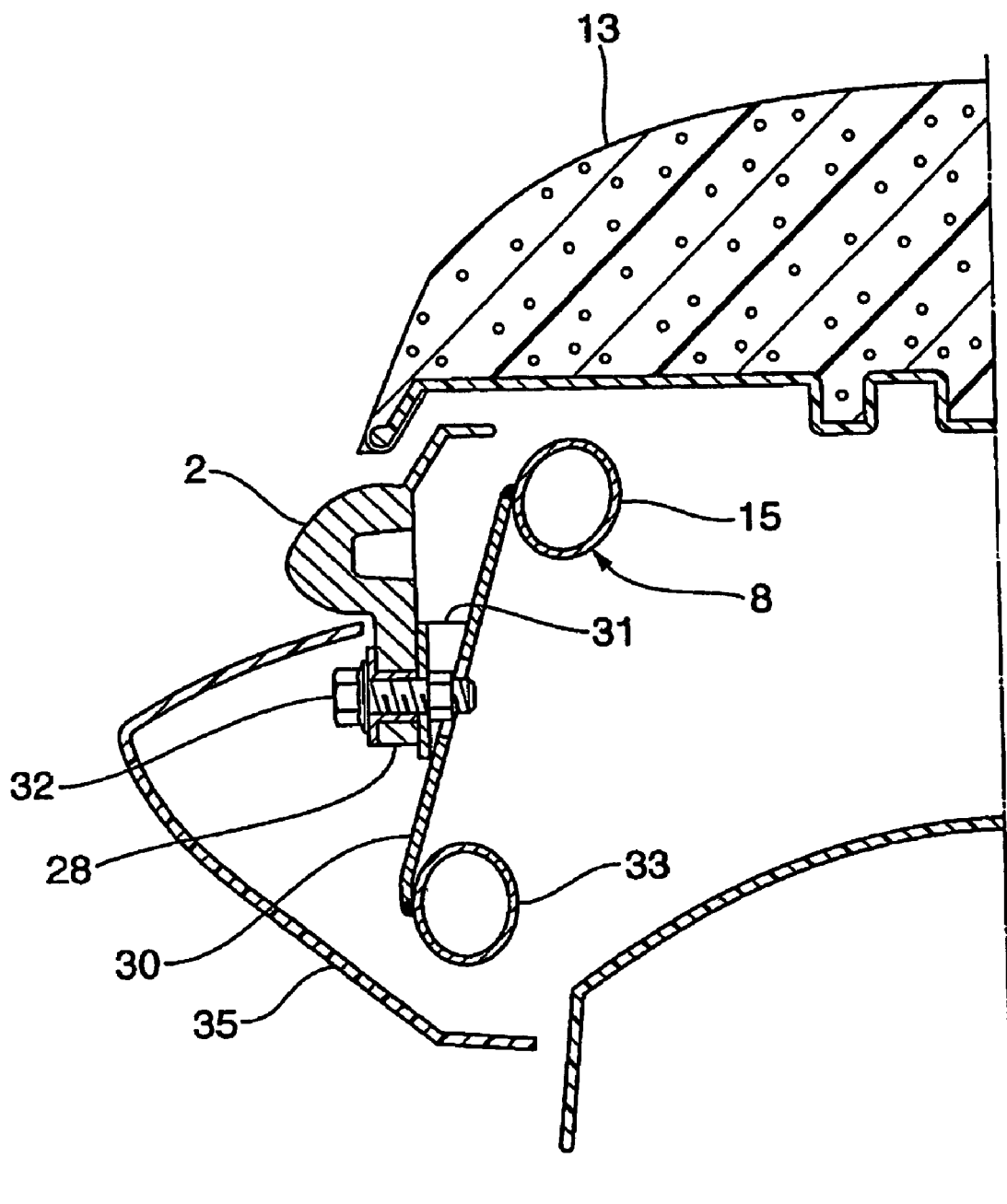
FIG. 12 is a cross sectional view taken along the line XII-XII in FIG. 4.
Figure 13:
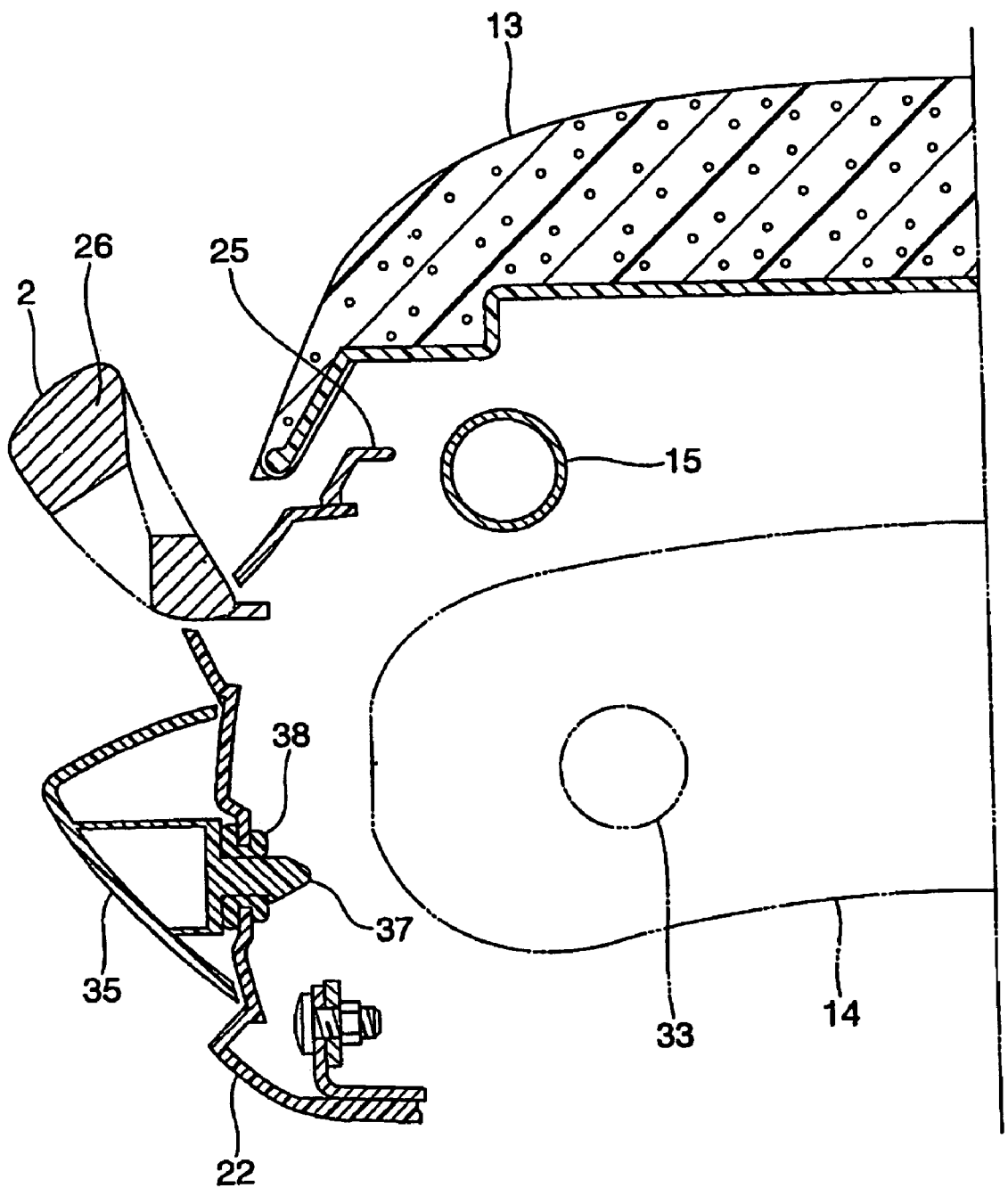
FIG. 13 is a cross sectional view taken along the line XIII-XIII in FIG. 4.
Figure 14:
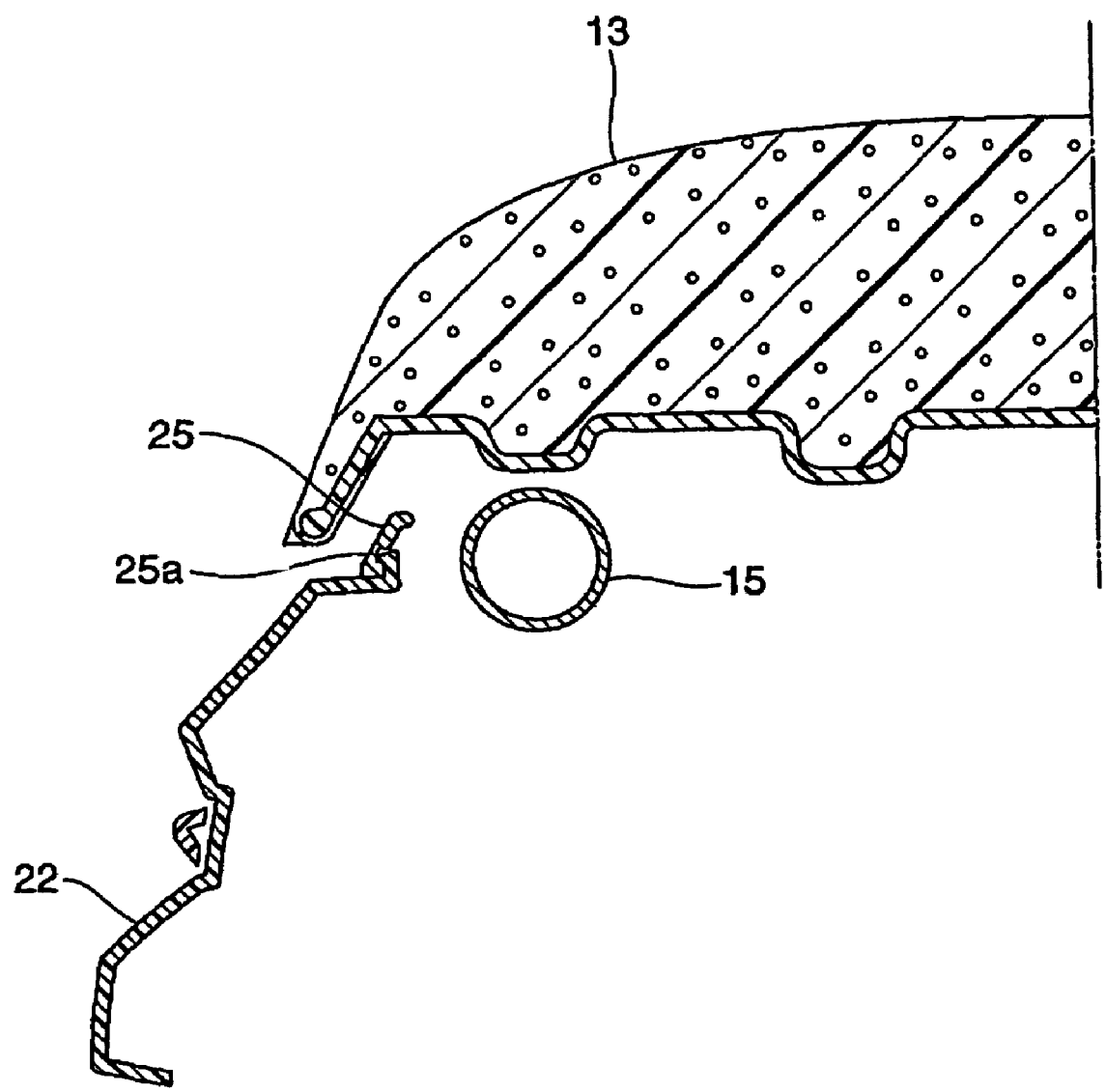
FIG. 14 is a cross sectional view taken along the line XIV-XIV in FIG. 4.
Figure 15:
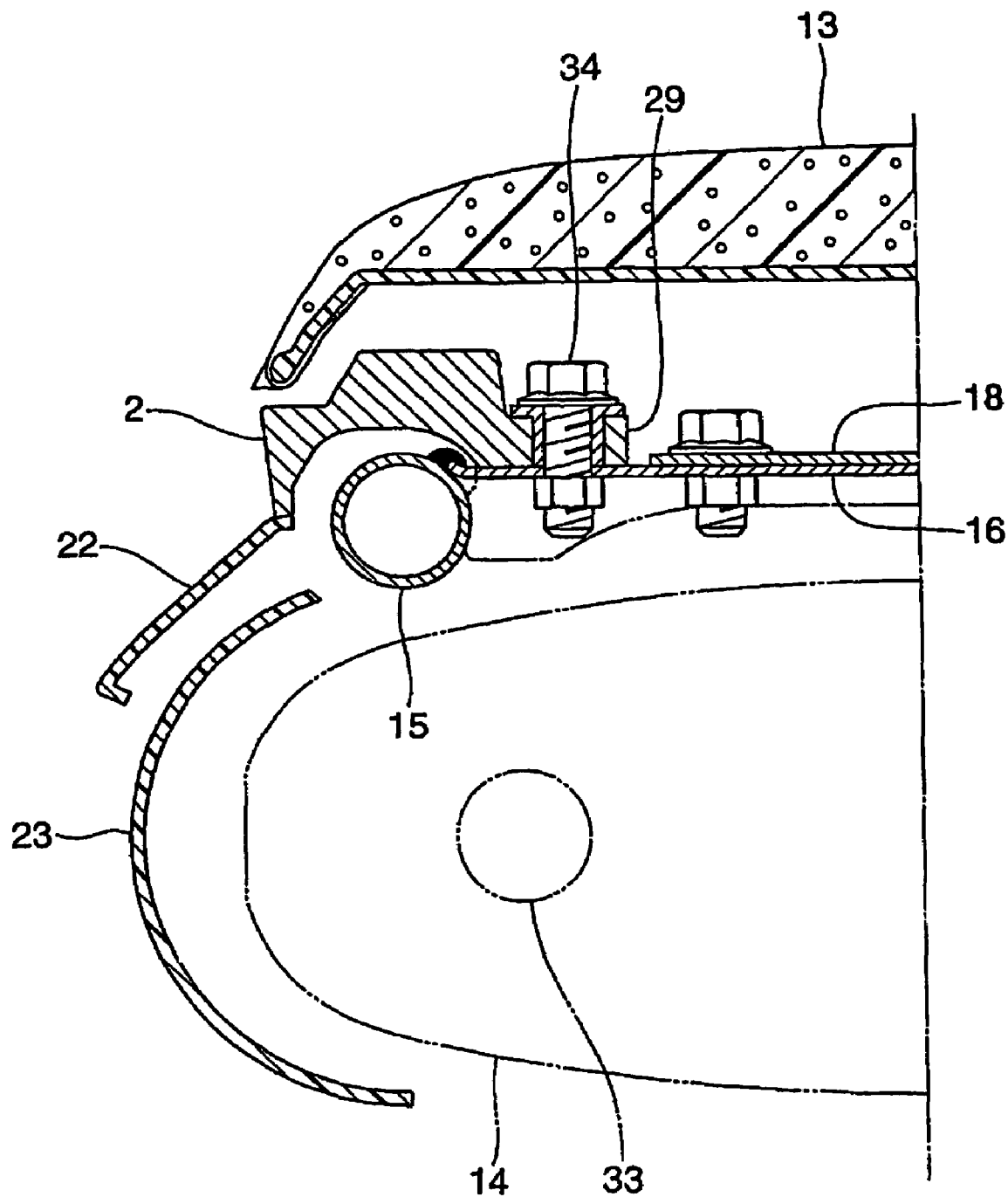
FIG. 15 is a cross sectional view taken along the line XV-XV in FIG. 4.
Figure 16:
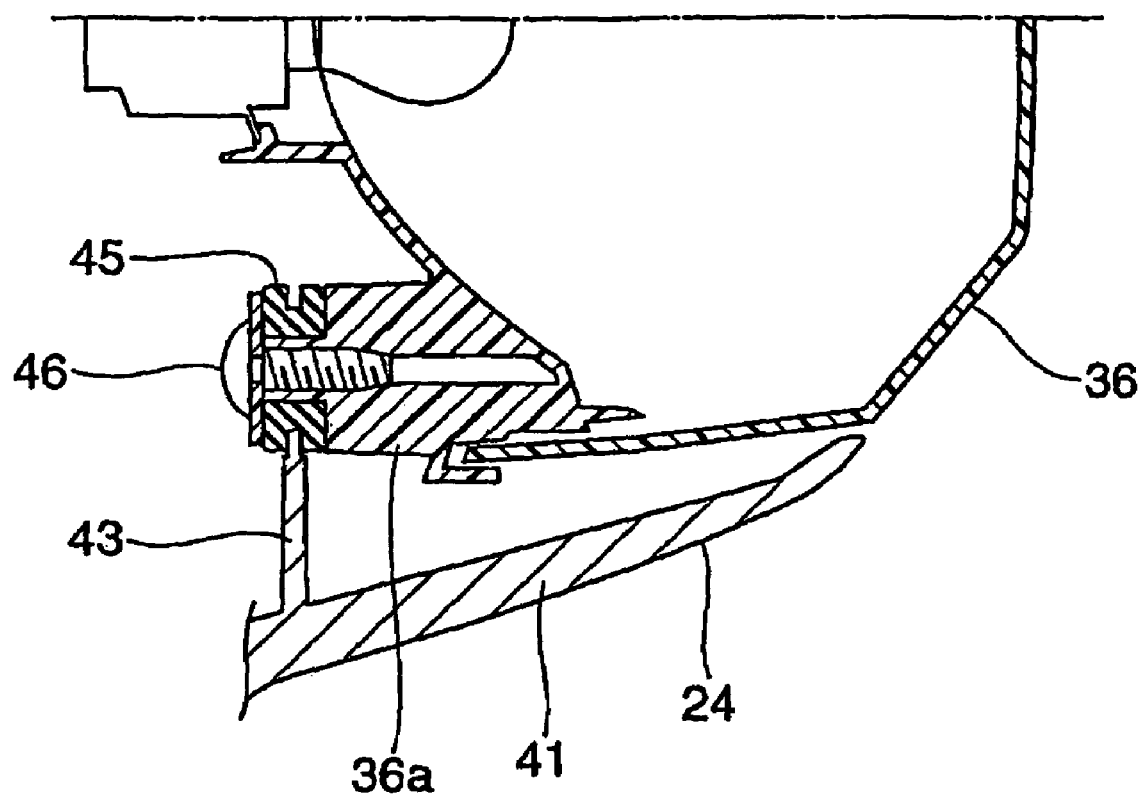
FIG. 16 is a cross sectional view taken along the line XVI-XVI in FIG. 5.

FIG. 11 is a cross sectional view taken along the line XI-XI in FIG. 7 and showing the glove bar and the seat cowl, FIG. 12 is a cross sectional view taken along the line XII-XII in FIG. 4, FIG. 13 is a cross sectional view taken along the line XIII-XIII in FIG. 4, FIG. 14 is a cross sectional view taken along the line XIV-XIV in FIG. 4, FIG. 15 is a cross sectional view taken along the line XV-XV in FIG. 4, and FIG. 16 is a cross sectional view taken along the line XVI-XVI in FIG. 5. In addition, only a left side of a vehicle body with respect to a center line C of the vehicle body in a left and right direction is drawn in FIGS. 12 to 16.

In the figures, the reference numeral 1 denotes a motorcycle provided with glove bars 2 according to the embodiment. The reference numeral 3 denotes a front wheel of the motorcycle 1, 4 a front fork, 5 a steering handle, 6 a front cowling, 7 a fuel tank, 8 a body frame, 9 a water-cooled type 4-cycle 4-cylinder engine, 10 an exhaust pipe, 11 a rear arm, 12 a rear wheel, and 13 a seat.

The exhaust pipe 10 is formed so that exhaust passages of every cylinder are collected into one below the engine 9, and extends upward through a front end of the rear arm 11 from the collected part to be connected to a muffler 14 (see FIGS. 4 and 5) positioned between the seat 13 and the rear wheel 12. The seat 13 is provided by forming a driver seat 13a and a fellow rider seat 13b integrally and supported on a pair of left and right seat rails 15 (see FIGS. 4 to 6), which form a rear portion of the body frame 8.

The seat rails 15, respectively, are formed from a pipe having a circular cross section as shown in FIGS. 12 to 15 and rear ends thereof are connected to each other by a cross member 16 as shown in FIGS. 6 and 15. Mounted to the cross member 16 are rear portions of the glove bars 2 described later and the muffler 14.

The muffler 14 is formed to assume a shape of a thin box as a whole, and mounted to the cross member 16 through a mount bracket 17 welded to a substantially central portion of an upper surface of the muffler in a longitudinal direction and a mount plate 18 mounted to the mount bracket 17 as shown in FIGS. 5 and 6. The mount plate 18 is mounted, in a state of being placed on the cross member 16, to the cross member 16 from above by a mount bolt 19, and mounts thereto the mount bracket 17 through a grommet 20. The grommet 20 is mounted with an axial direction thereof directed in a longitudinal direction of the vehicle body.

Also, a downstream end of the exhaust pipe 10 is connected to an end of the muffler 14 on a front and right side of the vehicle body and two tail pipes 21 are protrusively provided at an end of the muffler on a rear side of the vehicle body to be aligned in a left and right direction. Further, mounted to a rear portion of the muffler 14 is a protector 23 for thermal insulation, which is structured to cover an outwardly exposed portion of a rear side cover 22 described later, as shown in FIGS. 1 and 4.

As shown in FIGS. 7 to 10, the glove bars 2 are formed to be symmetrical in a left and right direction of the vehicle body, and formed integrally on rear ends thereof with a seat cowl 24 described later. Stated in detail, as shown in FIG. 8, the glove bar 2 on a left side of the vehicle body and the glove bar 2 on a right side of the vehicle body, respectively, are formed integrally at rear ends thereof with both sides of the seat cowl 24 and connected to each other through the seat cowl 24.

A material for formation of an integral molding of the glove bars 2 and the seat cowl 24 uses a reinforced plastics with glass fibers, obtained by mixing reinforcing glass fibers in a nylon resin so as to provide for a volume ratio of about 50%.

As shown in FIG. 8, the respective glove bars 2 comprise a bar 25 extending inside the vehicle body in the longitudinal direction of the vehicle body, a grip 26 projecting outside the vehicle body from a front end of the bar 25 to extend toward the rear of the vehicle body, and a stay 27 connecting between a rear end of the grip 26 and a rear end of the bar 25.

The bar 25 and the grip 26 are inclined forwardly downward (are inclined downward in a forward direction of the vehicle body) as viewed in side views of FIGS. 4 and 7 and formed so that rear ends thereof are positioned inside the vehicle body relative to front ends thereof as viewed in a plan view of FIG. 8. The grip 26 according to the embodiment is formed so that a central portion thereof in the longitudinal direction projects outside the vehicle body to be curved, and projects relative to the stay 27 toward the rear of the vehicle body to be curved inside the vehicle body. In this manner, by adopting a construction, in which the rear end of the grip 26 projects rearward from the stay 27, a hook of a baggage band (not shown) corded on the stay 27 is prevented by the projecting portion of the grip 26 from being disengaged.

In addition, the glove bars 2 can be composed of the grip 26 and the stay 27 without the use of the bar 25.

The glove bar 2 is mounted to the vehicle body by mounting a front mount bracket 28, which is protrusively provided at the front end of the glove bar 2 to be directed downward, and a rear mount bracket 29, which is provided to extend inside the vehicle body from the rear end of the bar 25, respectively, to the body frame 8.

As shown in FIGS. 5 and 7, the front mount bracket 28 is formed to be positioned on an extension of the front end of the forwardly downwardly extending grip 26, and mounted to a mount plate 31 welded to a gusset plate 30 of the body frame 8 from outside the vehicle body by a mount bolt 32 as shown in FIG. 12. The front mount bracket 28 constitutes a front mount referred to in the invention according to claim 2.

As shown in FIGS. 4, 5, and 12, the gusset plate 30 serves to connect an upper end of a back stay 33 to the seat rail 15, and formed to extend vertically to be welded to portions of the seat rail 15 and the back stay 33, respectively, outside from the vehicle body.

The rear mount bracket 29 is mounted, in a state of being placed on the cross member 16 as shown in FIG. 15, to the cross member 16 from above by mount bolts 34.

In addition, only a head of the mount bolt 34 is drawn by broken lines in FIG. 5. The rear mount bracket 29 constitutes a rear mount referred to in the invention according to claim 2.

Those portions of the glove bars 2, which are mounted to the body frame 8, are covered from laterally by front side covers 35 and the rear side cover 22 as shown in FIGS. 1 and 4 and covered from above by the seat 13 as shown in FIG. 2, in order to prevent coming-out in outward apppearance of the vehicle body. In addition, since a tail light 36 described later is provided rearwardly of the mounted portions of the glove bars 2, the mounted portions are not seen from the rear of the vehicle body.

The front side cover 35 is formed to have a doglegged cross section, which is convex outside the vehicle body, as shown in FIG. 12, and mounted to the seat rail 15 and the rear side cover 22 through mount pins 37 (see FIGS. 4 and 13), which are provided on both ends in the longitudinal direction of the vehicle body to project toward an inside of the vehicle body. The pins 37 engage detachably with grommets 38, which are supported on the body frame 8 or the rear side cover 22 as shown in FIG. 13.

The rear side cover 22 extends longitudinally along the bars 25 of the glove bars 2 and is formed to be U-shaped as viewed in plan view to be opened toward the front of the vehicle body. Portions of the rear side cover 22 on left and right sides of the vehicle body are connected to each other below the tail light 36. Also, as shown in FIG. 13, front ends of the rear side cover 22 are formed to face rear ends of the front side covers 35 inside the vehicle body, and provided on portions thereof inside the vehicle body with the grommets 38.

Further, an upper end of the rear side cover 22 is provided to extend on the bars 25 inside the vehicle body to engage therewith so that an interior of the rear side cover 22 cannot be seen from below the bars 25 as shown in FIG. 14. Engagement holes 25a of the bars 25, with which the upper end of the rear side cover 22 engages, are formed in plural at intervals in the longitudinal direction of the vehicle body as shown in FIG. 7. The front side covers 35, the rear side cover 22, and the seat cowl 24 described later surround a lower portion of the seat 13.

The seat cowl 24 formed integral with rear ends of the glove bars 2 is formed by both side walls 41, 41 in the left and right direction of the vehicle body, and an upper wall 42 extending horizontally to connect upper ends of the both side walls 41, 41 together, as shown in FIGS. 7 to 11.

The both side walls 41, 41 are formed to extend rearwardly of the vehicle body from the grips 26 and the upper wall 42, and curved in a state of being made convex outside the vehicle body as viewed from the rear of the vehicle body as shown in FIG. 11. Also, the side walls 41 are formed on inner sides thereof with vertically extending reinforcement ribs 43. The reinforcement ribs 43 are formed in the vicinity of those rear portions of the glove bars 2, which are mounted to the body frame 8, to connect between lower ends of the side walls 41 and the upper wall 42 as shown in FIGS. 7 and 8.

Also, the reinforcement ribs 43 are formed on vertically central portions thereof with semicircular U-shaped grooves 44, which are opened inwardly of the vehicle body, as shown in FIGS. 9 and 11, and grommets 45 (see FIG. 16) for support of the tail light are mounted to the U-shaped grooves 44.

Struts 36a of the tail light 36 are mounted to the grommets 45 by tapping screws 46 as shown in FIG. 16. That is, the reinforcement ribs 43 function to reinforce the seat cowl 24 and function as brackets to mount the tail light 36 to the seat cowl 24.

The tail light 36 is mounted in two locations in the left and right direction to the seat cowl 24 through the reinforcement ribs 43 in a state, in which an end thereof toward the front of the vehicle body faces inside the seat cowl 24.

With the motorcycle 1 constructed in the manner described above, since the rear ends of the left and right glove bars 2 are connected together through the seat cowl 24 formed integral with the rear ends of the glove bars 2, no clearances are formed on connecting portions of the glove bars 2 and the seat cowl 24 even when the both are not formed with high accuracy as in the case where the glove bars 2 and the seat cowl 24 are provided separately. Therefore, it is possible to realize reduction in cost and maintain outward appearance at the same time.

Also, since front ends and rear portions of the glove bars 2, respectively, are mounted to the body frame 8, the seat cowl 24 is thus positioned outside a support system for the glove bars 2. Therefore, although the seat cowl 24 is formed integral with the glove bars 2, a load applied on the seat cowl 24 from the glove bars 2 can be made smaller than that in a conventional one. That is, since a load applied on the glove bars 2 can be effectively born by the body frame 8, loading on the seat cowl 24 due to the load can be decreased.

With the motorcycle 1 according to the embodiment, the mount bolts 32 that mount the front ends of the glove bars 2 to the body frame 8 are positioned on forward extensions of the grips 26, so that even when a rider seated on the seat 13 grasps the glove bars 2 to apply a load thereon in a manner to push the glove bars downward, the forwardly downwardly inclined glove bars 2 apply the load to the body frame 8 obliquely forward and downward through the mount bolts 32. Therefore, a load transmission path is formed to be straight, those portions of the front ends of the glove bars 2, which are mounted to the body frame 8, can be formed to be compact and to have a high strength.

On the other hand, a worker can easily clamp the mount bolts 34, by which the rear portions of the glove bars 2 are mounted to the body frame 8, while looking down from above.

With the motorcycle 1 according to the embodiment, those portions of the rear portions of the glove bars 2, which are mounted to the body frame 8, are covered from above by the seat 13, so that the seat 13 can prevent the mounted portions from coming out in outward appearance of the vehicle body. Therefore, any cover that exclusively covers and hides the mounted portions of the rear portions of the glove bars 2 is unnecessary.

In the motorcycle 1 according to the embodiment, since the both side walls 41 of the seat cowl 24 in the left and right direction are formed to be curved in a state of being made convex outside the vehicle body as viewed from the rear of the vehicle body, the both side walls 41, 41 can be enhanced in stiffness as compared with the case where the both side walls 41, 41 of the seat cowl 24 are formed to assume a shape of a vertically extending flat plate.

With the motorcycle 1 according to the embodiment, the vertically extending reinforcement ribs 43 are provided on the inner sides of the side walls 41 of the seat cowl 24 and the reinforcement ribs 43 connect between the lower ends of the side walls 41 and the upper wall 42, so that the reinforcement ribs 43 can further enhance the side walls 41 of the seat cowl 24 in stiffness.

Since the motorcycle 1 according to the embodiment adopts a construction, in which the reinforcement ribs 43 function as brackets for mounting of a tail light, any bracket that exclusively mount the tail light 36 is unnecessary.

With the motorcycle 1 according to the embodiment, since the reinforcement ribs 43 are provided in the vicinity of those rear portions of the glove bars 2, which are mounted to the body frame 8, the seat cowl 24 can be reinforced for a load transmitted through the seat cowl 24 to one of the glove bars 2 in the left and right direction from that portion of the other of the glove bars 2, which is mounted to the body frame 8. Therefore, while a construction, in which the seat cowl 24 is formed integral with the glove bars 2, is adopted, it is possible to surely prevent the seat cowl 24 from being deformed.

With the motorcycle 1 according to the embodiment, since an integral molding of the glove bars 2 and the seat cowl 24 is molded from a reinforced plastics with glass fibers, the integral molding can be formed to be relatively lightweight although it is formed to be large in size as compared with conventional glove bars. In addition, as a material for formation of the integral molding, a reinforced plastics with glass fibers, obtained by mixing glass fibers, or reinforcing fibers other than glass fibers in a plastic material other than a nylon resin can be used, or an aluminum alloy will do.

While the invention has been described in detail and with reference to a particular embodiment, it is apparent to those skilled in the art that various changes and modifications can be applied without departing from the spirit and the scope of the invention.

INDUSTRIAL APPLICABILITY

The invention can be applied to motorcycles, in which a seat cowl and glove bars are provided, as described above, the technical thought of the invention is applicable to those portions intended for an increase in strength, lightening, and an improvement in outward appearance, in the relationship between a frame for other vehicles than motorcycles and a resin member provided to cover the frame.

The invention claimed is:

1. A motorcycle comprising:
   a seat cowl provided rearwardly of a seat;
   a pair of left and right glove bars provided in the vicinity of a rear portion of the seat, wherein rear portions of the glove bars and the seat cowl are formed integrally, and front and rear portions of the glove bars, respectively, are mounted to a body frame;
   a front mount, by which the front portions of the glove bars are mounted to a vehicle body from a lateral direction, and
   a rear mount, by which the rear portions of the glove bars are mounted to the vehicle body from above, wherein
   the glove bars are arranged so that at least the front portions thereof are inclined forward and downward as viewed in side view and the front mount is arranged on forward extensions of the front portions of the glove bars.

2. The motorcycle according to claim 1, wherein the rear mount is covered by the seat from above.

3. The motorcycle according to claim 1, wherein both side walls of the seat cowl in a left and right direction are formed curvedly to be made convex outside the vehicle body as viewed from the rear of the vehicle body.

4. The motorcycle according to claim 3, further comprising a reinforcement rib provided on an inner surface of a side wall of the seat cowl to extend vertically.

5. A motorcycle comprising:
a seat cowl provided rearwardly of a seat;
a pair of left and right glove bars provided in the vicinity of a rear portion of the seat, wherein
rear portions of the glove bars and the seat cowl are formed integrally,
front and rear portions of the glove bars, respectively, are mounted to a body frame, and
both side walls of the seat cowl in a left and right direction are formed curvedly to be made convex outside the vehicle body as viewed from the rear of the vehicle body;
a reinforcement rib provided on an inner surface of a side wall of the seat cowl to extend vertically; and
a tail light mounted to the reinforcement rib.

6. The motorcycle according to claim 4, wherein the reinforcement rib is provided in the vicinity of the rear mount by which the rear portions of the glove bars are mounted to the vehicle body from above.

7. The motorcycle according to any one of claims 3, 4 or 6, wherein the glove bars and the seat cowl are molded from a reinforced plastic with glass fibers.

8. The motorcycle according to any one of claims 1, 2 or 5, wherein the glove bars and the seat cowl are molded from a reinforced plastic with glass fibers.

* * * * *